United States Patent

Coppola

[15] 3,677,677
[45] July 18, 1972

[54] DEVICE FOR THE AUTOMATIC MOLDING OF PASTE-LIKE, SOLIDIFIABLE PRODUCTS, SUCH AS, FOR INSTANCE, COSMETICS AND THE LIKE

[72] Inventor: Mario Coppola, Milan, Italy
[22] Filed: May 1, 1970
[21] Appl. No.: 33,553

[30] Foreign Application Priority Data

June 26, 1969 Italy..................................18763 A/69

[52] U.S. Cl..............................425/109, 425/225, 425/261, 425/317, 425/404, 425/442, 425/DIG. 32
[51] Int. Cl.............................................B29c 3/02, B29c 7/00
[58] Field of Search....................18/20 C, 20 G, 20 H, 20 T, 18/4 R, 4 P, DIG. 32, 5 BF, 5 BT, 5 RR, 26 R

[56] References Cited

UNITED STATES PATENTS

| 2,564,624 | 8/1951 | Hoos | 18/20 C X |
| 2,263,302 | 11/1941 | Johnson | 18/DIG. 32 |
| 3,475,786 | 11/1969 | Pearson | 18/5 R |
| 3,541,645 | 11/1970 | Bunting | 18/20 C |
| 3,473,192 | 10/1969 | Martelli | 18/19 F X |

FOREIGN PATENTS OR APPLICATIONS

| 1,160,246 | 2/1958 | France | 18/20 C |

Primary Examiner—Robert L. Spicer, Jr.
Attorney—Carl C. Batz

[57] ABSTRACT

The device comprises a rotating table for molds whereby at least part of the elements of said molds are movable to permit the removal of the molten and solidified material.

Said molds are combined with members by means of which the solidified material, after removal thereof from the mold is neatly arranged in a retaining and supporting member.

13 Claims, 4 Drawing Figures

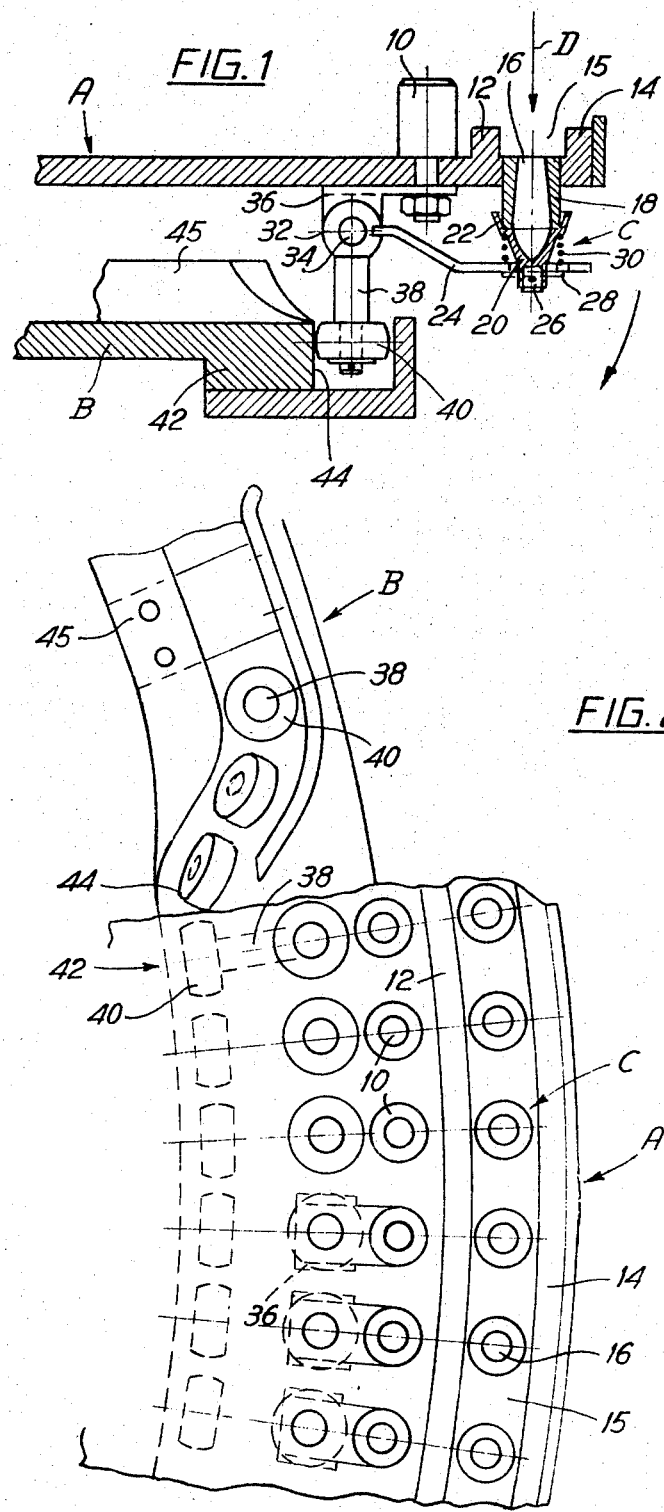

DEVICE FOR THE AUTOMATIC MOLDING OF PASTE-LIKE, SOLIDIFIABLE PRODUCTS, SUCH AS, FOR INSTANCE, COSMETICS AND THE LIKE

The present invention concerns a device for the automatic molding of paste-like, solidifiable products such as, for instance, cosmetic products, pharmaceutical products and the like. To realize cosmetic products (lipsticks) or medicament (suppositories and the like) an advantageous paste-like product is molten and then poured into molds or forms, solidified, removed from said mold and advantageously packed or wrapped. Generally, said operations are carried out manually and in this case the production is substantially limited, subject to drawbacks and is unhygienic.

Several attempts have already been made to overcome these limitations and, at the same time, to eliminate the drawbacks by utilizing as molds containers in which the molten material is filled, cooled and solidified to assume the desired shapes. This solution, which satisfies, on one hand, certain requirements, causes, on the other hand, other drawbacks and, in certain cases, cannot be realized. In particular, this solution does not permit the solidified product to be subjected to further treatments, for instance, to cover it or provide it with other stratified materials.

The object of the present invention is to provide a device for the automatic, continuous and regular productions of molten products, solidifiable in molds, which are removed from said molds and advantageously gathered to be conveyed towards further processing steps and/or to be packed. Another object of the invention is to provide a device which is not only capable to shape said solidifiable products or lipsticks, but also to restrain such products to supports to submit them thus to further processing stages or to wrap or pack into boxes said lipsticks in a satisfactory and rational way without the products being touched by hands.

The device of the invention, which can be applied to apparatuses comprising a plurality of molds, which are relatively movable along melting, delivery, dosing, cooling and conditioning stations for the molten material, to remove the solidified material from said molds, is characterized in that each of said molds, supported by a table which is movable with respect to said stations, consists of at least two complemental, axially superposed parts, one of which is integral with said table, whereas the other is removably retained by the first through driving members allowing the partial release of the fixed part in such a way that when said table moves, the molds are successively first closed and filled with the molten material and after solidification of said material the removable part of the molds is taken off and the obtained lipstick is removed from the fixed part of the considered mold.

According to the invention below the molds the movable table shows members to orderly receive the lipsticks removed from the molds and to transfer said lipsticks into respective containers or supporting members to pack them or to subject them to further processing steps.

The invention will now be described with reference to the attached drawings showing, by way of example, and advantageous embodiment of the device applied to an apparatus provided with a revolving table which moves along the path into which the melting, dosing and delivery stations for the molten material as well as the cooling and packing stations for the obtained lipstick are inserted. In the drawings:

FIG. 1 is the partial radial section along the two above-considered tables of the apparatus.

FIG. 2 is a plan view of part of the fixed platform of the apparatus.

Figure 3:
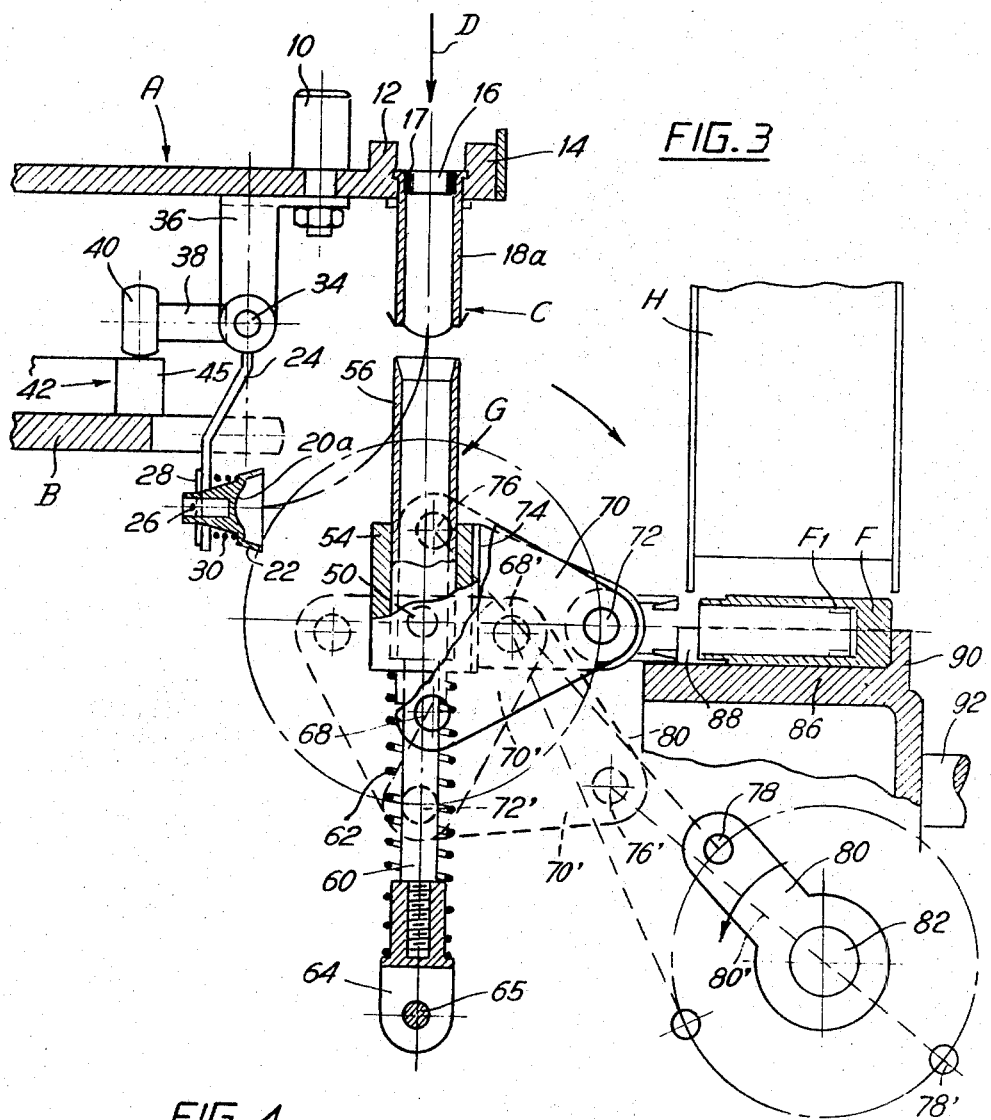

FIG. 3, analogue to FIG. 1, shows another embodiment of the device.

Figure 4:
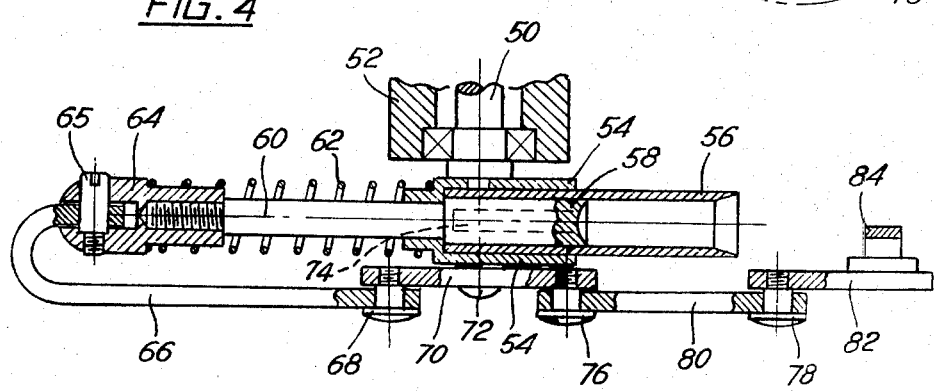

FIG. 4 is the horizontal section of part of the device shown in FIG. 3.

With reference to FIGS. 1 and 2, the illustrated device comprises two circular tables A and B, which are movable one with respect to the other. In the illustrated case, table A is rotated step by step around a vertical axis by means of appropiated drives consisting, for instance, of a small ratched pawl for engagement with pins 10 provided in suitable positions by the periphery of said table A in order to impart to said table an angular displacement of the desired width.

Table A shows furthermore at its periphery two annular projections 12 and 14 delimiting together with the upper surface of said table an annular groove 15 forming a pouring channel in which the delivery nozzle of a dosing member is provided, which dosing member is presented by the bottom of a container for the molten material. The bottom of annular groove 15 is provided with holes 16, each of which constitutes the opening of a pouring mold C which is advantageously shaped in accordance with the lipstick to be produced.

In the illustrated case, mold C consists of at least two parts 18 and 20, said parts being superposed and axially aligned, in order to reproduce the pouring cavity, and said parts are so arranged that they can be easily spaced apart from each other, to permit the quick removal of the molded and solidified object or paste.

As shown in FIG. 1, the upper part 18 of mold C consists of a bushing, one outer end of said bushing being fixed to table A, in such a way that the edge of opening 16 of said bushing is aligned and coincident with the bottom of groove 15. The lower part 20 of mold C consists of a small cap provided with an annular stop, co-operating with the lower end of bushing 18, in order to complete said mold. The closure between the two parts 18, 20 of the mold is ensured by springed means which act on small cap 20, said cap being provided with a countersunk crown 22, to facilitate the connection of said cap to bushing 18. Furthermore, said small cap 20 is retained, with advantageous play, by a pierced arm 24, whereas a small pivot 26 threads freely into the hole of said arm, said pivot being situated below said cap and provided with a washer 28 co-operating with the edge of said hole, in order to locate small cap 20 with respect to arm 24. A spring 30 is inserted between arm 24 and the bottom of flared crown 22, to ensure the engagement, by adhesion, of the edges of the small cap 20 with bushing 18, whereas, when said small cap is moved away from bushing 18, it is restrained, as required, by arm 24.

Arm 24 is integral with a drilled head 32 restrained, in turn, by means of pivot 34, to a fork 36 fixed to the lower surface of table A; said head retains a pivot 38, provided, at its free end, with a roller 40 to form a square lever, the fulcrum whereof consists of pivot 34. If desired, said square lever can be influenced by counterweights and by springed means, which act on said lever, to rotate it in anti-clockwise direction, to move cam 20 away from bushing 18.

Roller 40 of lever 24–38 co-operates with a cam 42 extending all along the circumference of fixed table B. The profile of said cam is subdivided into two areas, one of which 44 is substantially vertical and the other horizontal 45, said areas being arranged in succession, in such a way as to ensure, when rollers 40 engage the first of said areas, the coupling between the two parts 18 and 20 of molds C ; whereas when said rollers engage with the horizontal area 45, square levers 24–38 are oscillated by 90° in clockwise direction, to move small caps 20 away from bushings 18 and to permit the removal of the pastes from molds C.

A thrust member D which is schematically shown in FIG. 1, is provided, in an advantageous position, within the horizontal area 45 of cam 42, above the revolving table A, said thrust member consisting of an axially movable rod which can be threaded into hole 16 of each of molds C, to remove the solidified paste. Said thrust member is provided (with reference to the direction of the rotational motion of table A) after scraping members co-operating with the bottom of annular groove 15, to remove the molten and solidified material poured in excess into molds C.

Previous to the scraping member, table A passes, with part of its periphery, through a cooling and conditioning chamber, to solidify the molten material previously introduced into molds C.

The performance of said device will be easily understood, in consideration of the following clarifications regarding the alternate embodiment of the invention, shown in FIGS. 3 and 4.

Considering the alternate embodiment of the invention shown in FIGS. 3 and 4, the like or equivalent parts are identified by the same reference numerals; that is, A indicates the movable table provided with annular groove 15, to the bottom of which the upper parts 18 of molds C are removably fixed. In this alternate embodiment, upper body 40 consists of a cylindrical bushing 18a, the lower part of which is closed by means of a cap 20a, said cap being retained, as previously explained, by a corresponding square lever 24–38. In said alternate embodiment, opening 16 of mold C is delimited by one ring 17 forming, next to the end of the paste, a tapered appendix which is utilized, as will be explained in the following, to restrain said paste to a support or to a tube or case. In the embodiment shown in FIGS. 3 and 4, mold C is designed to realize a lipstick-paste, such lipsticks being fixed and retained, in the well known manner, by small bowl F1 shown by a case F. Said small bowl F1 is axially slidable within said case.

To fit the paste into small bowl F1 it is necessary to turn said paste upside down, after removal thereof from bushing 18a. For this purpose the device of the invention is provided with members G to collect, to retain and to thread the paste into case F, in such a way that the tapered end of said paste is forced into small bowl F1.

The collapsing and threading member G is provided below movable table A, next to thrust member D and said member G is driven in synchronism with the motion of said table. Said member shows a pivot 50 rotatably retained by a support 52, integral with the frame to retain table B. The axis of pivot 50 is horizontal, i.e. perpendicular to the rotational axis of table A. At one of its ends, pivot 50 retains a bushing 54, in such a way that the axis of said bushing is perpendicular to the axis of said pivot 50. One tube 56 is removably fixed inside bushing 54. Said tube can be exchanged with a new one, whenever required and houses the paste with a limited play. A thrust member 58, retained by rod 60, is slidably arranged within said tube. A helical spring 62 is threaded into rod 60 to retain thrust member in a rearward position and in engagement with the bottom of tube 56.

The free end of rod 60 terminates with a small fork 64 which connects, by means of a thorn 65, a tensioning rod and another thorn 68 to one of the ends of a rocker arm 70, the fulcrum of which is provided by a small wing 74 radially integral with bushing 54, in such a way that the axes of pivot 50 and of fulcrum 72 are parallel. The other end of rocker arm 70 connects, by means of pivots 76, 78 and link rod 80 to a crank-arm 82, keyed to shaft 84 of an appropriate main motor (not shown), the intervention of which is synchronized with the motion of the revolving table A.

Collapsing member G is so arranged that, when said member is at rest, i.e. vertical, the axis of tube 56 registers with the axis of bushing 18a. On the other hand, when member G is operated, said tube is collapsed by 90° to engage, with its end, a suitable stop which ensures the desired alignment between bushing 18a and case F.

In the device shown in FIGS. 3 and 4, the collapsing member G is combined with a drum 86 provided, at its periphery, with parallel grooves 88, each of which houses a case F and, at the same time, retains said case aligned with tube 56 when the latter is collapsed by 90°, in such a way that the free end of said tube engages the initial length of groove 88 on the surface of drum 86, Groves 88 are closed at one of the ends of drum 86, by a plate 90 to locate, in this way, cases F.

Drum 86 is integral with a shaft 92 driven, step by step, by an appropriated motor in synchronism with the motion of revolving table A, whereas grooves 88 of said drum can be aligned with the bottom of one or more hoppers H, containing cases F, covers and so forth.

The performance of the device according to the present invention will be now explained with reference to the apparatus of said device. In consideration of the fact that table 12 is moved, step by step, by means of the small ratchet pawl which engages pins 10, said table is successively conveyed through the various stations, to deliver the molten material into molds C; to cool said material; to remove the solidified product or paste from the mold; to collect and to package said paste.

In the device shown in FIG. 1, as the two parts 18–20 of mold C are truncated-conical in shape, the paste is expelled by means of thrust element D which unloads said paste on an inclined level which leads towards successive wrapping stations. On the other hand, in the embodiment shown in FIGS. 3 and 4, the paste, after removal thereof from bushing 18a of the molds of thrust member D, are collected, each time, by tube 56 and retained, with their lower end, to thrust element 58.

During the step-by-step motion of table A, shafts 84 and 92 of the collapsing and threading member G are actuated, i.e. crank 82 is rotated in anti-clockwise direction, in such a way as to rotate tube 56 and rod 60 by 90° in clockwise direction, till the free end of tube 56 engages the edge 88 of drum 86 and into alignment with case F which is disposed in groove 88.

The engagement of tube 56 with groove 88 stops and locates said parts with respect to each other.

Crank 82, which continues to rotate, causes rocker-arm 70 to oscillate, in clockwise direction, around fulcrum 72, said fulcrum assuming now position 72' as shown in FIG. 3. As a consequence, thrust element 58 is shifted in constrast with spring 62, toward the other end of tube 56 and the paste, which has been previously introduced into tube 56, is extracted from said tube and simultaneously introduced into case F. The shifting motion of thrust element 58 continues till the tapered end of the above mentioned paste is forced into small bowl F1 where it is retained, whereas said thrust element 58, after completion of its run, is arreared, since crank 80 running through the negative length, reaches again its above mentioned initial or starting position, thus returning tube 56 and rod 60 to their initial, vertical position, after which said parts are ready to repeat the above described operation with another piece of paste introduced into said tube, whereas drum 86 is angularly shifted, to take another case F out of container H. The proceding case, filled with paste, is then provided with a cover, and forwarded to a successive packing station.

During the revolving motion of table A, square levers 24–38 of molds C are returned, from their collapsed position shown in FIG. 3, to the lifted position shown in FIG. 1, in consideration of the profile shown by cam 42.

Owing to the advantageous arrangement of the various members forming the above described device, said device permits exceptionally rapid working speed. Furthermore, if the paste, after removal thereof from mold C, requires further processing, said operations can be easily performed, since such operations are automatic and executed in perfect accordance with the prescriptions of the art. It is possible to modify and to vary the above described and illustrated device in accordance with the different requirements of the end users and with the features of the materials to be processed. It is understood that the protection claimed extends as well to the apparatus which incorporates the device of the present invention, without confining from the domain of this invention.

We claim:

1. A device for the automatic molding of paste-like solidifiable materials comprising a rotatable table, a plurality of molds carried in angularly spaced relation by said table each of said molds having an opening at the top surface of said table and including two complimentary mold parts one of which is secured to said table and the other of which is removably secured to said one part, said table being rotatable from one position at which loading of a mold may take place to a second position where the contents of the mold may be removed, means for rotating said table from said one position to said second position, and means for removing said other mold part from said one mold part as said table is rotated from said one position to said second position to permit removal of the contents of said mold.

2. A device as set forth in claim 1 in which said mold parts have guide members to facilitate the engagement and separation of said one mold parts from said other mold parts.

3. A device as set forth in claim 1 in which said last mentioned means includes levers having arms attached to said other mold parts and means for urging said levers in one direction about their pivots to press said mold parts together when said table is in said one position and in another direction about their pivots to separate said mold parts when said table is moved to said second position.

4. A device as set forth in claim 3 including a cam track, said levers having members in contact with said track, said track being shaped to press one of said levers in said one direction to hold the mold parts together when said table is in said one position and to press said one lever in the other direction to cause the arm of said lever to separate said mold parts when said table is moved to said second position.

5. A device as set forth in claim 3 wherein the attachment between said arms of said levers includes springs positioned to urge said other mold parts toward said one mold parts thus to provide tight engagement between the two mold parts.

6. A device as set forth in claim 1 wherein said other mold part constitutes the bottom portion of the complete mold, whereby when said other mold parts are removed the contents of said molds may be removed downwardly from the molds.

7. A device as set forth in claim 5 including means located below said molds and driven in synchronism with said table for receiving the content of each mold one by one as it comes downwardly from the molds and passing it to another location.

8. A device as set forth in claim 6 wherein said receiving means includes a tube which is vertically aligned with said mold when said table is in said second position so as to catch said mold contents when removed downwardly from the molds.

9. A device according to claim 8 wherein said receiving means includes at least one tube retained by a support, the rotational axis of which is at right angle to that of the mold and alignable, each time, with said tube; and by driving means to impart to the tube at least two angular positions, to which the opening of said tube is aligned in such a way as to register with the fixed part of the mold and with that of the container and support for the paste.

10. A device according to claim 6 characterized by a shaft keyed sideways to the paste-carrying tube by a lever fulcrummed to said tube, the ends of which connect, by means of articulated drives, at one side, through a linkwork, to the motor which drives the table and, at the other side, with a spring thrust member provided by said tube, in such a way that, when said lever is actuated, it imparts an oscillating motion to the tube, in order to change the position of said tube from the fixed part of the mold toward the container for the paste and to successively actuate the pushing member for the introduction of said paste into the container.

11. A device as set forth in claim 10 including means for moving said tube to discharge the mold contents therefrom and to move the tube back again for receiving the contents of the next mold when its parts are separated by said lever moving means.

12. A device according to claim 6 characterized by supporting means to removably retain containers for the pastes, equipped with means to stop and to retain the free end of the tube for the paste, in alignment with that of the container.

13. A device according to claim 9 characterized by a rotating drum, rotatable about its own axis and provided, at its periphery, with recesses for the containers for the pastes by actuating means synchronized with the driving means of the paste-carrier tube, to impart a step-by-step motion to said tube by means to introduce into the housings of said drum the supports for the pastes and eventual covers for said supports, such means being associated with at least one container for the supports delivering into said drum by stopping means for the paste-carrier tube provided by the drum and designed to retain said tube in alignment with the axis of grooves when said grooves reach, successively, the top of said drum; and adjustable means provided by the grooves of the drum, to retain the supports for the pastes in the desired position.

* * * * *